(12) United States Patent
Sarkis et al.

(10) Patent No.: US 12,120,682 B2
(45) Date of Patent: Oct. 15, 2024

(54) TECHNIQUES FOR PROVIDING AN INDICATION OF A RESERVATION CONFLICT

(71) Applicant: QUALCOMM Incorporated, San Diego, CA (US)

(72) Inventors: Gabi Sarkis, San Diego, CA (US); Tien Viet Nguyen, Bridgewater, NJ (US); Shuanshuan Wu, San Diego, CA (US); Kapil Gulati, Belle Mead, NJ (US); Junyi Li, Franklin Park, NJ (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/220,234

(22) Filed: Apr. 1, 2021

(65) Prior Publication Data

US 2021/0360671 A1    Nov. 18, 2021

Related U.S. Application Data

(60) Provisional application No. 63/025,507, filed on May 15, 2020.

(51) Int. Cl.
*H04W 72/20* (2023.01)
*H04L 5/00* (2006.01)

(52) U.S. Cl.
CPC ........... *H04W 72/20* (2023.01); *H04L 5/0048* (2013.01)

(58) Field of Classification Search
CPC ............. H04W 72/1278; H04W 76/14; H04W 72/042; H04W 28/26; H04W 72/02;
(Continued)

(56) References Cited

U.S. PATENT DOCUMENTS

2017/0332390 A1* 11/2017 Li ............................. H04L 5/16
2018/0227882 A1*  8/2018 Freda .................... H04W 8/005
(Continued)

FOREIGN PATENT DOCUMENTS

CN      110808818 A  *  2/2020  ............. H04L 5/003
CN      111670595 A  *  9/2020  ............. H04W 72/02
(Continued)

OTHER PUBLICATIONS

CAICT: "Considerations on the Resource Allocation for NR Sidelink Mode2", 3GPP TSG RAN WG1 Meeting #98, 3GPP Draft, R1-1909349, 3rd Generation Partnership Project (3GPP), Mobile Competence Centre, 650, Route Des Lucioles, F-06921 Sophia-Antipolis Cedex, France, vol. RAN WG1, No. Prague, Aug. 26, 2019-Aug. 30, 2019, Aug. 16, 2019 (Aug. 16, 2019), 5 Pages, XP051765956, Retrieved from the Internet: URL: http://www.3gpp.org/ftp/tsg_ran/WG1_RL1/TSGR1_98/Docs/R1-1909349.zip [retrieved on Aug. 16, 2019] paragraph [02.4], figure 4.
(Continued)

*Primary Examiner* — Ayaz R Sheikh
*Assistant Examiner* — Louis Samara
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a second UE, a resource reservation that indicates a reservation for one or more resources; and transmit an indication that at least one resource of the one or more resources is in conflict with an additional resource reservation, the indication including one or more of an identification of the at least one resource, an identification of the resource reservation, or an identification of the second UE. Numerous other aspects are provided.

30 Claims, 10 Drawing Sheets

(58) Field of Classification Search
CPC . H04W 72/23; H04W 72/0446; H04W 16/14; H04L 5/0048; H04L 5/0053; H04L 5/003; H04L 1/1893; H04L 1/08; H04L 1/1822; H04B 17/318

See application file for complete search history.

(56) References Cited

U.S. PATENT DOCUMENTS

| | | | | |
|---|---|---|---|---|
| 2018/0234888 | A1* | 8/2018 | Yasukawa | H04W 4/40 |
| 2020/0236655 | A1* | 7/2020 | Bharadwaj | H04W 28/26 |
| 2020/0344722 | A1* | 10/2020 | He | H04W 72/0446 |
| 2021/0160849 | A1* | 5/2021 | Sun | H04W 72/23 |
| 2021/0250913 | A1* | 8/2021 | Ganesan | H04W 76/14 |
| 2022/0124711 | A1* | 4/2022 | Zhou | H04W 16/14 |
| 2022/0191903 | A1* | 6/2022 | Bae | H04L 1/1893 |

FOREIGN PATENT DOCUMENTS

| | | | | |
|---|---|---|---|---|
| CN | 113316967 | A * | 8/2021 | H04W 72/02 |
| CN | 113711644 | A * | 11/2021 | H04L 1/08 |
| CN | 114402678 | A * | 4/2022 | |
| KR | 102272168 | B1 * | 7/2021 | |
| WO | WO-2018166508 | A1 * | 9/2018 | H04L 29/02 |
| WO | WO-2020022781 | A1 * | 1/2020 | H04L 1/1812 |
| WO | WO-2020093002 | A1 * | 5/2020 | H04W 28/26 |
| WO | WO-2020153998 | A1 * | 7/2020 | |
| WO | WO-2020159303 | A1 * | 8/2020 | H04L 5/0053 |
| WO | WO-2020192695 | A1 * | 10/2020 | H04L 1/1822 |

OTHER PUBLICATIONS

CATT: "On Mode 2 Resource allocation in NR V2X", 3GPP TSG RAN WG1 Meeting #97, 3GPP Draft, R1-1906316, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), 10 Pages, XP051727766, Retrieved from the Internet: URL: http://www.3gpp.org/ftp/Meetings%5F3GPP%5FSYNC/RAN1/Docs/R1%2D1906316%2Ezip [retrieved on May 13, 2019] paragraph [03.3], section 3.

Interdigital Inc: "Resource Allocation for NR V2X", 3GPP RAN WG1 Meeting #95, 3GPP Draft, R1-1813164 (R16 V2X WI AI72414 Resource Allocation), 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051555157, 9 Pages, Retrieved from the Internet: URL: http://www.3gpp.org/ftp/Meetings%5F3GPP%5FSYNC/RAN1/Docs/R1%2D1813164%2Ezip [retrieved on Nov. 11, 2018] paragraph [0002].

International Search Report and Written Opinion—PCT/US2021/025544—ISA/EPO—Aug. 2, 2021.

TCL Communication: "Resource Allocation for NR Sidelink Mode 2", 3GPP Draft, 3GPP TSG RAN1 WG1 Meeting #98bis, R1-1910411_RAN1_NR-V2X_Resource_Alloc_Mode 2, 3rd Generation Partnership Project (3GPP), Mobile Competence Centre, 650, Route Des Lucioles, F-06921, Sophia-Antipolis Cedex, France, vol. RAN WG1, No. Chongqing, CN, Oct. 14, 2019-Oct. 20, 2019, Oct. 4, 2019 (Oct. 4, 2019), XP051808185, pp. 1-8, Retrieved from the Internet: URL: https://ftp.3gpp.org/tsg_ran/WG1_RL1/TSGR1_98b/Docs/R1-1910411.zip R1-1910411_ran1_nr-v2x_resource_alloc_mode2.pdf [retrieved on Oct. 4, 2019] Preemption Indication on Sidelink Channels, p. 6-p. 7, paragraph [003]—paragraph [0004].

Zte, et al., "Mode 2 Resource Allocation Schemes on Sidelink", 3GPP TSG RAN WG1 #98bis, 3GPP Draft, R1-1910279 Mode 2 Resource Allocation Schemes on Sidelink, 3rd Generation Partnership Project (3GPP), Mobile Competence Centre, 650, Route Des Lucioles, F-06921 Sophia-Antipolis Cedex, vol. RAN WG1, No. Chongqing, China, Oct. 14, 2019-Oct. 20, 2019, Oct. 5, 2019 (Oct. 5, 2019), 8 Pages, XP051789084, Retrieved from the Internet: URL: http://www.3gpp.org/ftp/tsg_ran/WG1_RL1/TSGR1_98b/Docs/R1-1910279.zip [retrieved on Oct. 5, 2019] paragraph [0006], the whole document.

* cited by examiner

TECHNIQUES FOR PROVIDING AN INDICATION OF A RESERVATION CONFLICT

CROSS-REFERENCE TO RELATED APPLICATION

This patent application claims priority to Provisional Patent Application No. 63/025,507, filed on May 15, 2020, entitled "TECHNIQUES FOR PROVIDING AN INDICATION OF A RESERVATION CONFLICT," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for techniques for providing an indication of a reservation conflict.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first user equipment (UE), may include receiving, from a second UE, a resource reservation that indicates a reservation for one or more resources; and transmitting an indication that at least one resource of the one or more resources is in conflict with an additional resource reservation, the indication including one or more of an identification of the at least one resource, an identification of the resource reservation, or an identification of the second UE.

In some aspects, transmitting the indication includes transmitting the indication via one or more of a sidelink control information (SCI) message, one or more medium access control control elements (MAC CEs), or a sidelink physical channel communication.

In some aspects, the at least one resource is reserved by the UE or an additional UE.

In some aspects, the resource reservation indicates a reservation for a resource that is not reserved, and the indication includes the identification of the at least one resource and not an identification of the resource that is not reserved.

In some aspects, the method includes receiving, before receiving the resource reservation, a previous resource reservation that indicates an additional reservation for the at least one resource, wherein the previous resource reservation has a same priority or a higher priority than a priority of the resource reservation.

In some aspects, the method includes transmitting, before receiving the resource reservation, a previous resource reservation, wherein the previous resource reservation has a same priority or a higher priority than a priority of the resource reservation.

In some aspects, the indication includes an identification of the at least one resource, and the identification of the at least one resource includes one or more of an identification of a frequency allocation of a physical sidelink control channel (PSCCH) of the at least one resource, an identification of a frequency allocation of a physical sidelink shared channel (PSSCH) of the at least one resource, or an identification of a time allocation of the at least one resource.

In some aspects, the indication includes the identification of the resource reservation, and the identification of the resource reservation includes one or more of an indication of a frequency allocation of a PSCCH associated with the resource reservation, an indication of a time allocation of the PSCCH associated with the resource reservation, an indication that identifies a portion of the resource reservation that indicates a reservation of the at least one resource, or a cover code index for a demodulation reference signal (DMRS) used for the resource reservation.

In some aspects, the identification of the resource reservation includes the indication that identifies the portion of the resource reservation that indicates the reservation of the at least one resource, and the indication that identifies the portion of the resource reservation that indicates the reservation of the at least one resource is indicated using a single bit.

In some aspects, the indication includes the identification of the second UE, and the identification of the second UE includes a source identification of the resource reservation.

In some aspects, the indication includes one or more of an indication of a priority of the resource reservation, or an indication of a priority of a previous resource reservation that indicates an additional reservation for the at least one resource.

In some aspects, transmitting the indication includes one or more of transmitting the indication as a sequence-based indication of the at least one resource, or transmitting the indication as a sequence-based indication of the resource reservation.

In some aspects, transmitting the indication includes one or more of transmitting a first indication, of the indication, associated with a first subchannel of the at least one resource, and transmitting a second indication, of the indication, associated with a second subchannel of the at least one resource.

In some aspects, transmitting the first indication includes transmitting the first indication using a first set of resource blocks that are associated with the first subchannel, or transmitting the second indication using a second set of resource blocks that are associated with the second subchannel.

In some aspects, the first set of resource blocks are associated with the first subchannel based at least in part on one or more of a location of the first subchannel, or a location of the resource reservation.

In some aspects, a method of wireless communication, performed by a user equipment, may include transmitting a resource reservation that indicates a reservation for one or more resources; and receiving an indication that at least one resource of the one or more resources is in conflict with an additional resource reservation, the indication including one or more of an identification of the at least one resource, an identification of the resource reservation, or an identification of the UE.

In some aspects, the method includes canceling, based at least in part on the indication including the identification of the at least one resource, a transmission on the at least one resource and performing a transmission on another resource of the one or more resources, or canceling, based at least in part on the indication including the identification of the resource reservation or the identification of the UE, transmissions on the one or more resources.

In some aspects, the resource reservation indicates a reservation for a resource that is not reserved.

In some aspects, the indication includes the identification of the at least one resource and not an identification of the resource that is not reserved, and the method further includes canceling a transmission on the at least one resource, and performing a transmission on the resource that is not reserved.

In some aspects, the indication includes an identification of the at least one resource, and the identification of the at least one resource includes one or more of an identification of a frequency allocation of a PSCCH of the at least one resource, an identification of a frequency allocation of a PSSCH of the at least one resource, or an identification of a time allocation of the at least one resource.

In some aspects, the indication includes the identification of the resource reservation, and the identification of the resource reservation includes one or more of an indication of a frequency allocation of a PSCCH associated with the resource reservation, an indication of a time allocation of the PSCCH associated with the resource reservation, an indication that identifies a portion of the resource reservation that indicates a reservation of the at least one resource, or a cover code index for a DMRS used for the resource reservation.

In some aspects, the identification of the resource reservation includes the indication that identifies the portion of the resource reservation that indicates the reservation of the at least one resource, and the indication that identifies the portion of the resource reservation that indicates the reservation of the at least one resource is indicated using a single bit.

In some aspects, the indication includes the identification of the UE, and the identification of the UE includes a source identification of the resource reservation.

In some aspects, the indication includes one or more of an indication of a priority of the resource reservation, or an indication of a priority of a previous resource reservation that indicates an additional reservation for the at least one resource.

In some aspects, receiving the indication includes one or more of receiving the indication as a sequence-based indication of the at least one resource, or receiving the indication as a sequence-based indication of the resource reservation.

In some aspects, receiving the indication includes one or more of receiving a first indication, of the indication, associated with a first subchannel of the at least one resource, and receiving a second indication, of the indication, associated with a second subchannel of the at least one resource.

In some aspects, receiving the first indication includes receiving the first indication using a first set of resource blocks that are associated with the first subchannel, or receiving the second indication using a second set of resource blocks that are associated with the second subchannel.

In some aspects, the first set of resource blocks are associated with the first subchannel based at least in part on one or more of: a location of the first subchannel, or a location of the resource reservation.

In some aspects, a first user equipment for wireless communication may include a memory and one or more processors operatively coupled to the memory. The memory and the one or more processors may be configured to receive, from a second UE, a resource reservation that indicates a reservation for one or more resources; and transmit an indication that at least one resource of the one or more resources is in conflict with an additional resource reservation, the indication including one or more of an identification of the at least one resource, an identification of the resource reservation, or an identification of the second UE.

In some aspects, a user equipment for wireless communication may include a memory and one or more processors operatively coupled to the memory. The memory and the one or more processors may be configured to transmit a resource reservation that indicates a reservation for one or more resources; and receive an indication that at least one resource of the one or more resources is in conflict with an additional resource reservation, the indication including one or more of an identification of the at least one resource, an identification of the resource reservation, or an identification of the UE.

In some aspects, a non-transitory computer-readable medium may store one or more instructions for wireless communication. The one or more instructions, when executed by one or more processors of a first UE, may cause the one or more processors to receive, from a second UE, a resource reservation that indicates a reservation for one or more resources; and transmit an indication that at least one resource of the one or more resources is in conflict with an additional resource reservation, the indication including one or more of an identification of the at least one resource, an identification of the resource reservation, or an identification of the second UE.

In some aspects, a non-transitory computer-readable medium may store one or more instructions for wireless communication. The one or more instructions, when executed by one or more processors of a UE, may cause the one or more processors to transmit a resource reservation that indicates a reservation for one or more resources; and receive an indication that at least one resource of the one or more resources is in conflict with an additional resource reservation, the indication including one or more of an identification of the at least one resource, an identification of the resource reservation, or an identification of the UE.

In some aspects, an apparatus for wireless communication may include means for receiving, from a UE, a resource reservation that indicates a reservation for one or more resources; and means for transmitting an indication that at least one resource of the one or more resources is in conflict with an additional resource reservation, the indication including one or more of an identification of the at least one resource, an identification of the resource reservation, or an identification of the UE.

In some aspects, an apparatus for wireless communication may include means for transmitting a resource reservation that indicates a reservation for one or more resources; and means for receiving an indication that at least one resource of the one or more resources is in conflict with an additional resource reservation, the indication including one or more of an identification of the at least one resource, an identification of the resource reservation, or an identification of the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
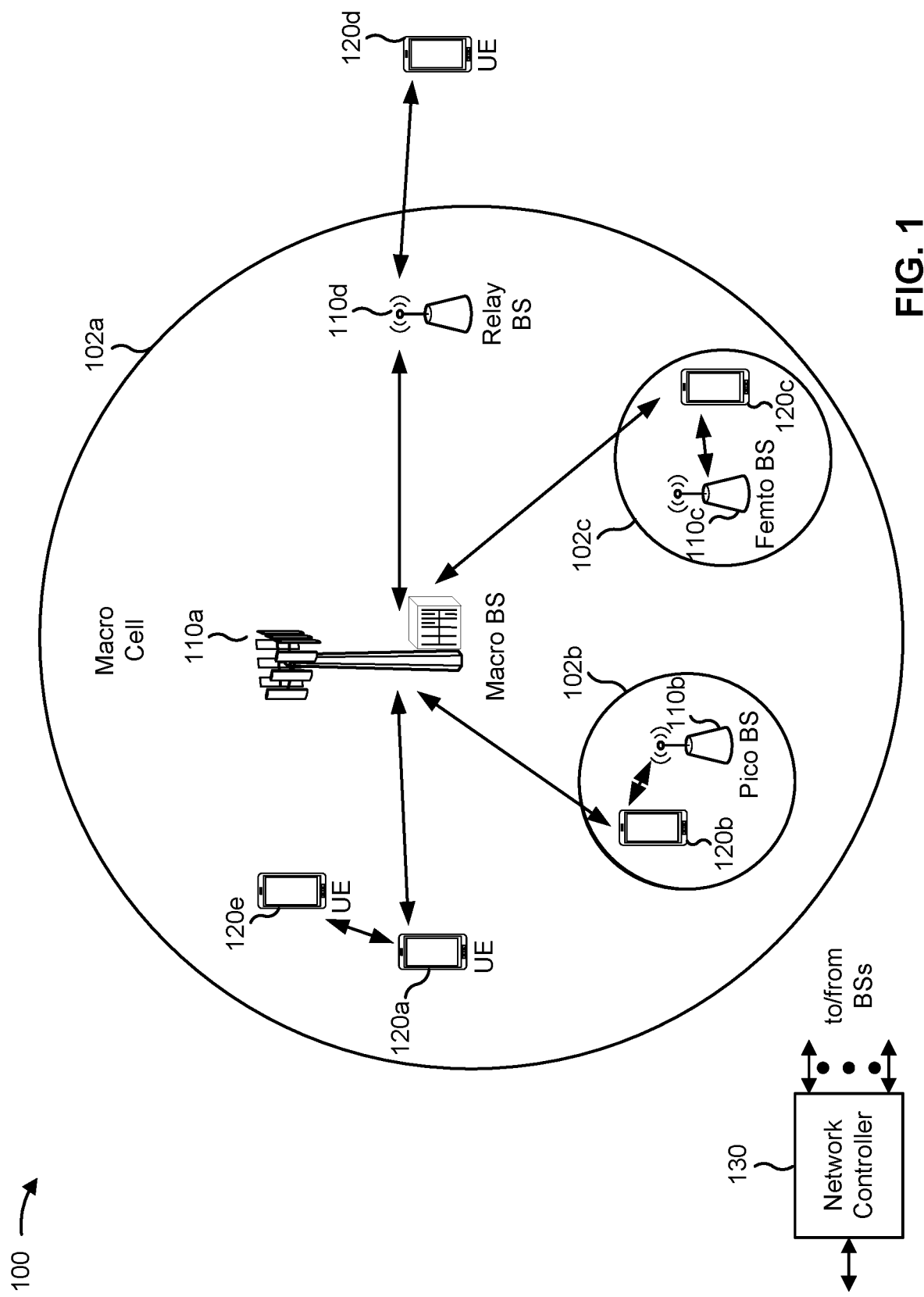
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
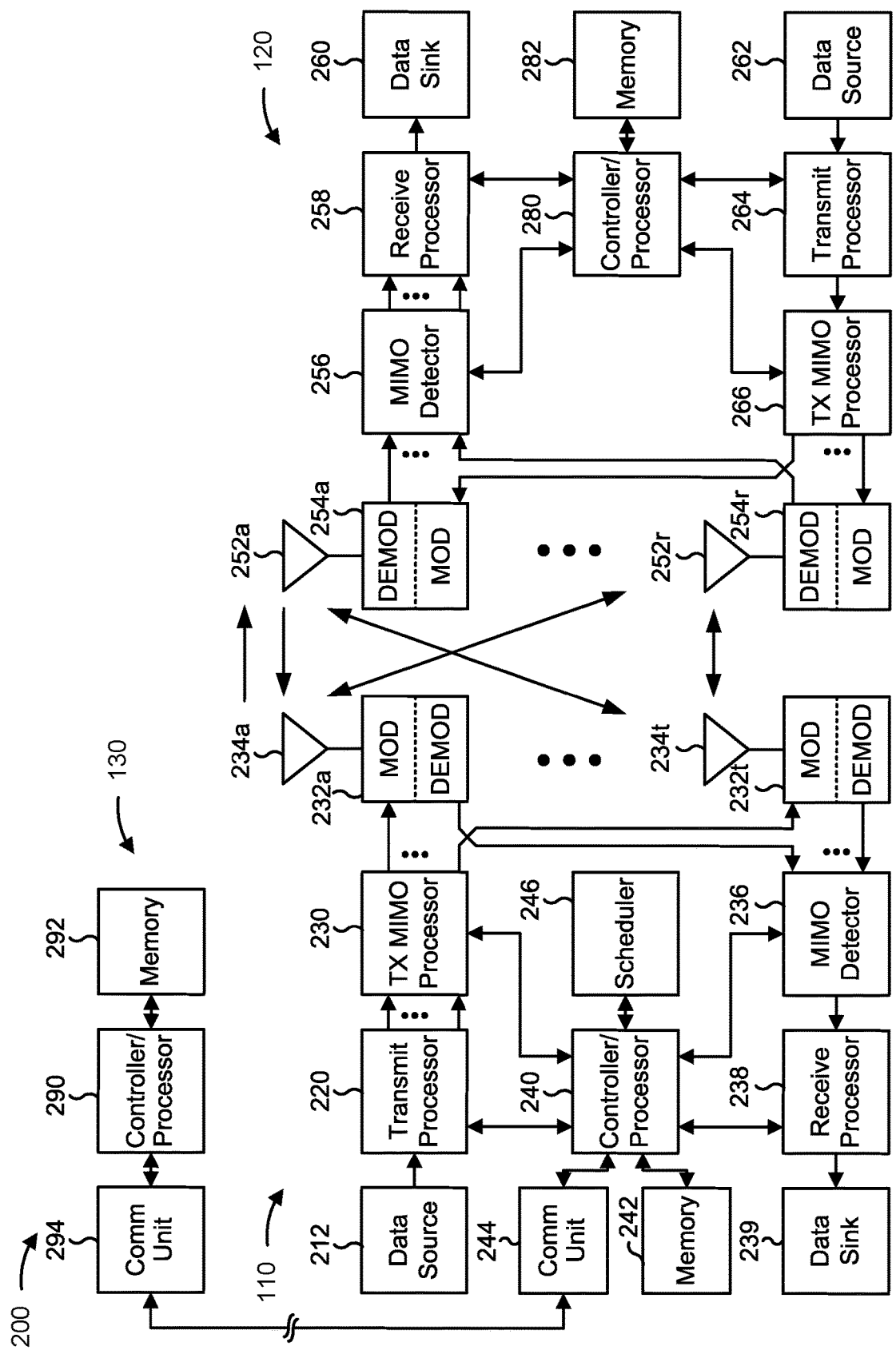
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with providing an indication of a reservation conflict, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving, from a second UE, a resource reservation that indicates a reservation for one or more resources; means for transmitting an indication that at least one resource of the one or more resources is in conflict with an additional resource reservation, the indication including one or more of an identification of the at least one resource, an identification of the resource reservation, or an identification of the second UE; and/or the like. In some aspects, UE 120 may include means for transmitting a resource reservation that indicates a reservation for one or more resources; means for receiving an indication that at least one resource of the one or more resources is in conflict with an additional resource reservation, the indication including one or more of an identification of the at least one resource, an identification of the resource reservation, or an identification of the UE; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
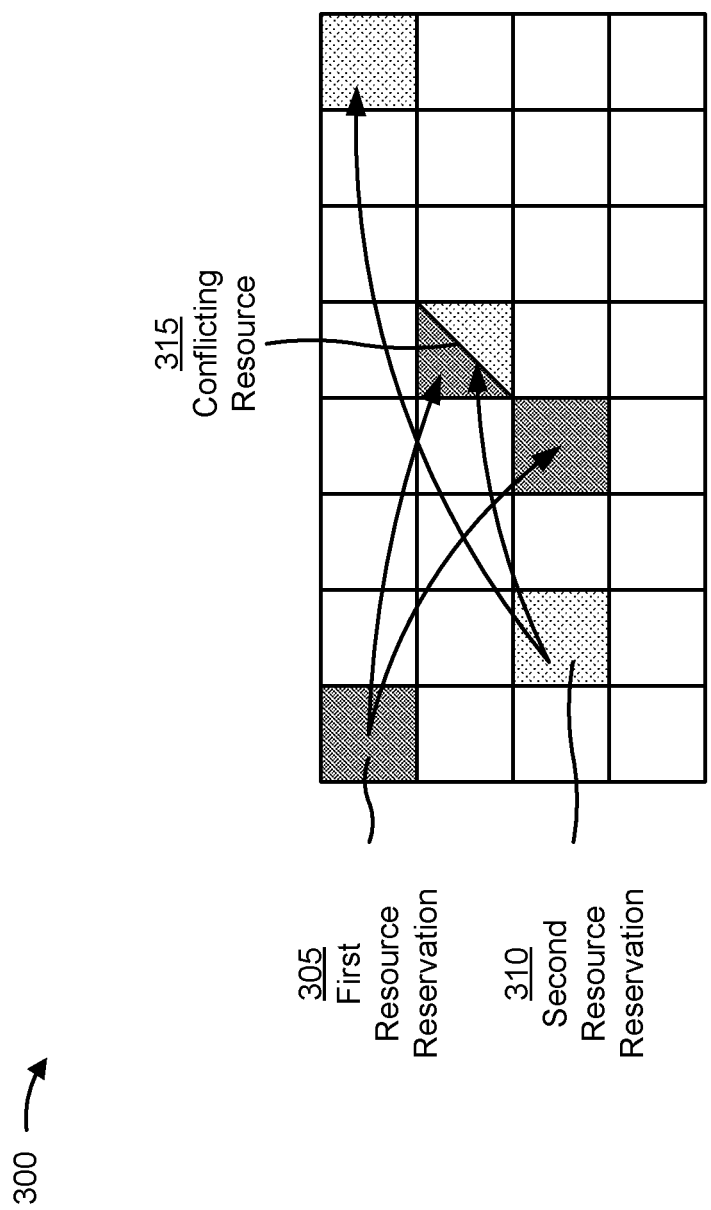
FIG. 3 is a diagram illustrating an example of a reservation conflict, in accordance with various aspects of the present disclosure.

FIG. 3 is a diagram illustrating an example 300 of a reservation conflict, in accordance with various aspects of the present disclosure. As shown in FIG. 3, a first UE and a second UE may communicate using, for example, sidelink channel communications. The first UE and the second UE may be part of a wireless network that includes one or more additional UEs.

As shown in FIG. 3, and by reference number 305, the first UE may transmit a first resource reservation in a first resource. The first UE may transmit the first resource reservation with a transmission of data in the first resource. The first resource may include one or more resource blocks. The first resource reservation may reserve one or more resources for future transmissions of the first UE.

As shown by reference number 310, the second UE may transmit a second resource reservation in a second resource. The second UE may transmit the second resource reservation with a transmission of data in the second resource. The second resource may include one or more resource blocks. The second resource reservation may reserve one or more resources for future transmissions of the second UE.

As shown by reference number 315, the first resource reservation and the second resource reservation may both reserve a conflicting resource (e.g., a resource reserved by different UEs). In some examples, the first resource reservation may have a same priority as, or a higher priority than, the second resource reservation. In some of these examples, the second resource reservation may not be permitted (e.g., based at least in part on a communication standard) to preempt the first resource reservation. In some of these examples, the second UE may be permitted to transmit the second resource reservation based at least in part on a signal strength (e.g., as observed by the second UE) of the first resource reservation. However, an additional UE may be within coverage of the first UE and the second UE, and may be unable to receive a transmission by the first UE in the conflicting resource if the second UE also transmits in the conflicting resource.

If the second UE is unaware that the conflicting resource is reserved by the first UE, the second UE may transmit in the conflicting resource, which may cause one or more additional UEs to fail to receive a transmission by the first UE or a transmission by the second UE in the conflicting resource. This failure may cause the first UE, the second UE, and/or one or more additional UEs to consume computing, network, and/or communication resources to reschedule transmissions and to transmit the rescheduled transmissions. Additionally, or alternatively, this failure may cause the one or more additional UEs to fail to receive the transmissions within a relevant time of the transmissions. For example, the one or more additional UEs (e.g., UEs associated with vehicles) may fail to receive an emergency braking warning from the first UE or the second UE, which may cause a collision.

As indicated above, FIG. 3 is provided as an example. Other examples may differ from what is described with respect to FIG. 3.

In some aspects described herein, a first UE may transmit, or receive from another UE, a first resource reservation that indicates a first reservation for one or more resources. The first UE may also receive, from a second UE, a second resource reservation that indicates a second resource reservation for one or more resources, including at least one resource that is reserved via the first resource reservation. The first UE may transmit (e.g., broadcast, unicast, and/or the like), an indication that the at least one resource is reserved. In some aspects, the indication may include an identification of the at least one resource, an identification of the second resource reservation, an identification of the second UE, and/or the like. In this way, the second UE may use one or more of the identifications to cancel a transmission in the conflicting resource instead of causing a conflict for one or more additional UEs that may attempt to receive a transmission from the first UE or the transmission from the second UE.

Additionally, or alternatively, by transmitting the indication including an identification of the second UE, the second UE may determine that it is the second UE, and not the first UE, that is to cancel a transmission in the conflicting resource. By transmitting the indication including an identification of the at least one resource and/or an identification of the second resource reservation, the second UE may cancel the transmission in the conflicting resource, while still transmitting in another resource that has not already been reserved (e.g., another resource that is available).

Figure 4:
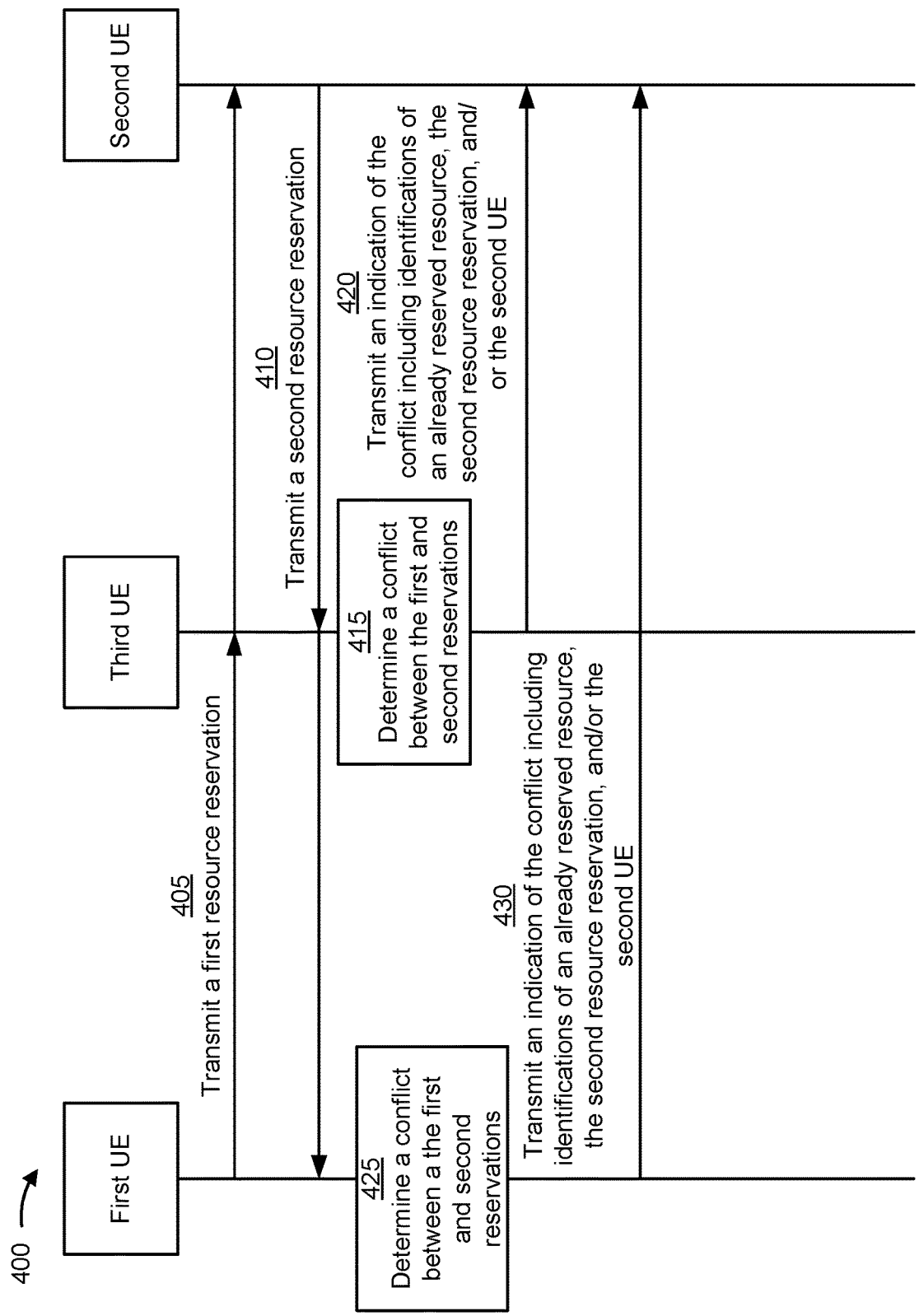
FIG. 4 is a diagram illustrating an example of techniques for providing an indication of a reservation conflict, in accordance with various aspects of the present disclosure.

FIG. 4 is a diagram illustrating an example 400 of techniques for providing an indication of a reservation conflict, in accordance with various aspects of the present disclosure. As shown in FIG. 4, a first UE (e.g., UE 120), a second UE (e.g., UE 120), and a third UE (e.g., UE 120) may communicate in a wireless network (e.g., wireless network 100).

In some aspects, the first UE, the second UE, and the third UE may communicate using sidelink channel communications (e.g., broadcast transmissions, unicast transmissions, and/or the like). In some aspects, a UE may transmit a first transmission that includes control information (e.g., sidelink control information (SCI) and data. The control information may indicate a resource reservation for one or more additional resources in which the UE may transmit additional data and/or control information.

As shown by reference number 405, the first UE may transmit a first resource reservation. The third UE, the second UE, and/or one or more additional UEs may receive the first resource reservation. In some aspects, the second UE may not receive the first resource reservation based at least in part on, for example, transmitting (e.g., an uplink transmission or a sidelink transmission) during the first resource reservation, the second UE being located outside of a coverage of the first UE, and/or the like. In some aspects, the second UE may receive the first resource reservation with a signal strength (e.g., a signal-to-interference-plus-noise ratio (SINR)) that fails to satisfy a threshold (e.g., indicating that the first UE is out of coverage of the second UE and is unlikely to cause a conflict).

As shown by reference number 410, the second UE may transmit a second resource reservation. In some aspects, the second resource reservation may indicate a reservation for a resource that is not reserved by the first UE, the second UE, and/or an additional UE that is in coverage of the second UE. In some aspects, the second UE may transmit the second resource reservation after, before, or simultaneous with the first resource reservation, The third UE, the first UE, and/or one or more additional UEs may receive the second resource reservation. In some aspects, the first UE may not receive the second resource reservation based at least in part on, for example, transmitting (e.g., an uplink transmission or a sidelink transmission)

during the second resource reservation, the first UE being located outside of a coverage of the second UE, and/or the like. In some aspects, the first UE may receive the second resource reservation with a signal strength that fails to satisfy the threshold (e.g., indicating that the second UE is out of coverage of the first UE and is unlikely to cause a conflict).

As shown by reference number 415, the third UE may determine that a conflict exists between the first reservation and the second reservation. In some aspects, the third UE may determine that the second resource reservation indicates a reservation for at least one resource that is reserved (e.g., by the first UE or another UE). In some aspects, at least one resource of the second reservation is in conflict with the first reservation based at least in part on the at least one resource of the second reservation having an overlap with a resource associated with the first reservation. In some aspects, the overlap can be an overlap in time, an overlap in frequency, or both. In some aspects, the third UE may determine that the second resource reservation is not permitted to preempt the first resource reservation based at least in part on, for example, the second resource reservation having a same or lower priority than the first resource reservation. In some aspects, such as when the second UE transmits the second resource reservation after or simultaneously with the first UE transmitting the first resource reservation, the third UE may determine that the second reservation is to be canceled (e.g., based at least in part on the first resource reservation being permitted to preempt the second resource reservation).

In some aspects, the third UE may determine to transmit (e.g., broadcast, unicast, and/or the like) an indication that at least one resource reserved via the second resource reservation is reserved (e.g., previously reserved, and/or reserved with a higher priority, among other examples). The third UE may determine information to transmit with the indication, such as an identification of the at least one resource that is in conflict, an identification of the second resource reservation, an identification of the first UE, an identification of the second UE, and/or the like. In some aspects, the third UE may determine one or more resources in which to transmit the indication. For example, the third UE may determine the one or more resources based at least in part on the one or more resources mapping to the second resource reservation, the reserved resource, and/or the like.

As shown by reference number 420, the third UE may transmit the indication of the conflict including identifications of a reserved resource (e.g., the at least one resource), the second resource reservation, and/or the second UE. In some aspects, the third UE may transmit the indication via an SCI message, one or more medium access control control elements (MAC CEs), or a sidelink physical channel (e.g., a physical sidelink shared channel (PSSCH)) communication.

In some aspects, the indication may identify the at least one resource that is reserved and may include an identification of another resource of the second resource reservation that is not reserved. In some aspects, the indication may identify the at least one resource as reserved, may identify the other resource of the second resource reservation as not reserved (e.g., an available resource as determined by the third UE), and/or the like. In this way, the second UE may determine to cancel a transmission in the reserved resource and/or to perform a transmission in the resource that is not reserved.

In some aspects, the identification of the at least one resource includes an identification of a frequency allocation of a physical sidelink shared channel (PSSCH) of the at least one resource, an identification of a time allocation of the at least one resource, and/or the like. In some aspects, the identification of the at least one resource may include an identification of a location (e.g., a time-frequency location) of a starting resource block of the PSSCH, the PSCCH, and/or the like.

In some aspects, the identification of the second resource reservation includes an identification of a frequency allocation of a PSCCH associated with the second resource reservation, an indication of a time allocation of the PSCCH associated with the second resource reservation, an indication that identifies a portion of the second resource reservation that indicates a reservation of the at least one resource, a cover code index for a demodulation reference signal (DMRS) used for the second resource reservation, and/or the like. In some aspects, the identification of the second resource reservation may include an identification of a location of a starting resource block of the PSCCH.

In some aspects, the identification of the at least one resource may include an identification of a location (e.g., a time location, a frequency location, or both) of a portion of the second resource reservation that indicates the reservation of the resource that is reserved. In this way, the second UE may distinguish the reservation of the reserved resource from a reservation of another resource that is not reserved. Additionally, or alternatively, the first UE may determine that the indication is not intended for the first UE because the first UE did not transmit the first resource reservation using resources at the identified location. In some aspects, the identification of the at least one resource may include a single bit indicator when a maximum number of future reservations is 2 or fewer. For example, 0 may indicate a first reserved resource and 1 may indicate a second reserved resource, with first and second determined based at least in part on an order indicated in the second resource reservation, a subframe in which the reserved resources are located, and/or the like.

In some aspects, the identification of the second UE includes a source identification of the second UE. For example, the third UE may determine the source ID associated with the second resource reservation and may indicate the source ID in the indication.

In some aspects, the indication may include an indication of a priority of the second resource reservation to indicate that the second resource reservation should be canceled. In some aspects, the indication may include an indication of a priority of the first resource reservation to indicate that the first resource reservation has priority for the reserved resource.

In some aspects, the second UE may transmit the indication including a first indication associated with a first subchannel of the reserved resource, one or more additional indications associated with one or more additional subchannels of the reserved resource, and/or the like. In some aspects, the second UE may transmit the first indication using a first set of resource blocks (e.g., one resource block or multiple resource blocks) that map to the first subchannel, may transmit the one or more additional indications using one or more additional sets of resource blocks that map to the one or more additional subchannels, and/or the like. In some aspects, the first set of resource blocks may map to the first subchannel based at least in part on a location of the first subchannel, a location of the second resource reservation, and/or the like.

As shown by reference number 425, the first UE, that transmitted the first resource reservation, may determine that a conflict exists between the first reservation and the second reservation. In some aspects, the first UE may determine that the second resource reservation indicates a reservation for at least one resource that is reserved by the first UE. In some aspects, at least one resource of the second reservation is in conflict with the first reservation based at least in part on the at least one resource of the second reservation overlapping with a resource associated with the first reservation. In some aspects, the at least one resource of the second reservation can overlap with a resource associated with the first reservation in time, in frequency, or both. In some aspects, the first UE may determine that the second resource reservation is not permitted to preempt the first resource reservation based at least in part on, for example, the second resource reservation having a same or lower priority than the first resource reservation.

As described relative to the third UE with reference to reference number 415, the first UE may determine to transmit (e.g., broadcast, unicast, and/or the like) an indication that at least one resource reserved via the second resource reservation is reserved. The first UE may determine information to transmit with the indication, such as an identification of the at least one resource that is in conflict, an identification of the second resource reservation, an identification of the first UE, an identification of the second UE, and/or the like. In some aspects, the first UE may determine one or more resources in which to transmit the indication. For example, the first UE may determine the one or more resources based at least in part on the one or more resources mapping to the second resource reservation, the reserved resource, and/or the like.

As shown by reference number 430, the first UE may transmit the indication of the conflict including identifications of a reserved resource (e.g., the at least one resource), the second resource reservation, and/or the second UE. In some aspects, the first UE may transmit the indication via an SCI message, one or more MAC CEs, or a sidelink physical channel (e.g., a PSSCH) communication. In some aspects, the first UE may transmit the indication using one or more techniques described herein, based at least in part on one or more conditions described herein, and/or the like (e.g., as described relative to the third UE with reference to reference number 420).

Based at least in part on the first UE and/or the third UE transmitting the indication, the second UE may use one or more of the identifications to cancel a transmission in the reserved resource instead of causing a conflict for the third UE and/or one or more additional UEs that may attempt to receive a transmission from the first UE or the transmission from the second UE. Additionally, or alternatively, by having the first UE or the third UE transmit the indication including an identification of the second UE, the second UE may determine that it is the second UE, and not the first UE, that is to cancel a transmission in the conflicting resource. By transmitting the indication including an identification of the at least one resource and/or an identification of the second resource reservation, the second UE may cancel the transmission in the conflicting resource, while still transmitting in another resource identified in the second resource reservation.

As indicated above, FIG. 4 is provided as an example. Other examples may differ from what is described with respect to FIG. 4.

Figure 5:
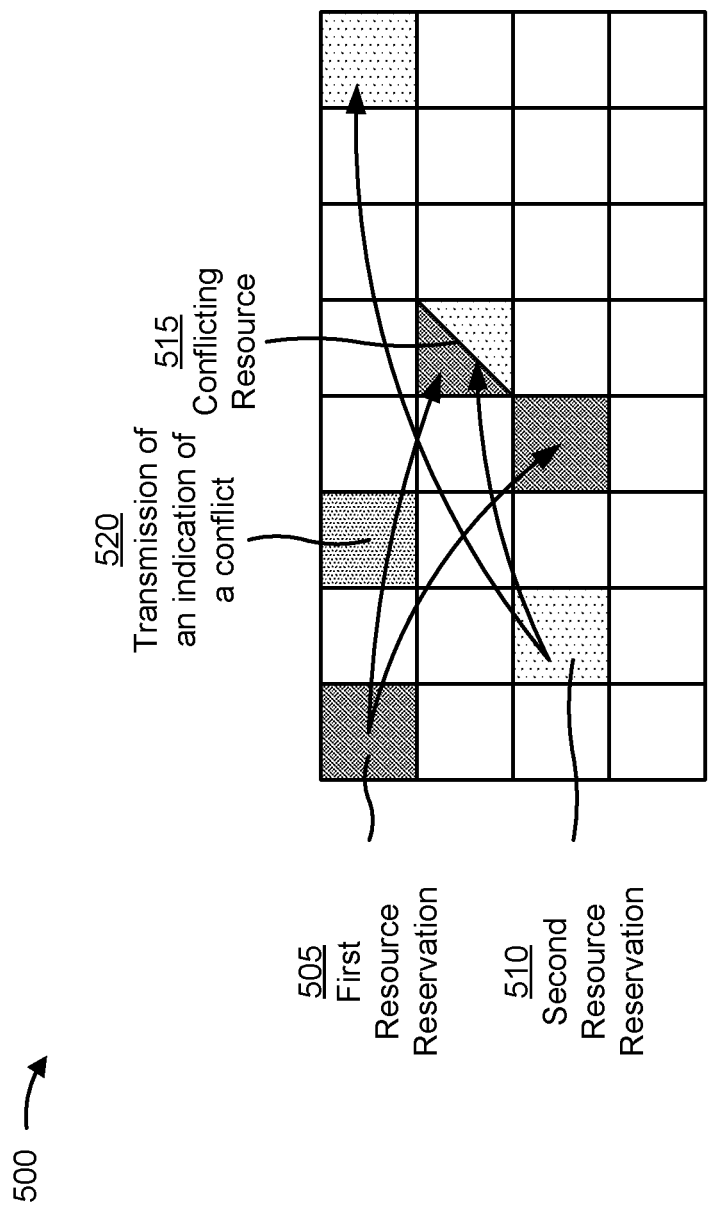
FIG. 5 is a diagram illustrating an example of techniques for providing an indication of a reservation conflict, in accordance with various aspects of the present disclosure.

FIG. 5 is a diagram illustrating an example 500 of techniques for providing an indication of a reservation conflict, in accordance with various aspects of the present disclosure. As shown in FIG. 5, a first UE (e.g., UE 120) and a second UE (e.g., UE 120) may communicate using, for example, sidelink channel communications. The first UE and the second UE may be part of a wireless network that includes one or more additional UEs.

As shown in FIG. 5, and by reference number 505, the first UE may transmit a first resource reservation in a first resource. The first UE may transmit the first resource reservation with a transmission of data in the first resource. The first resource may include one or more resource blocks. The first resource reservation may reserve one or more resources (e.g., two resources) for future transmissions of the first UE. In some aspects, the future transmissions may include new data, retransmissions of the data of the first resource, and/or the like.

As shown by reference number 510, the second UE may transmit a second resource reservation in a second resource. The second UE may transmit the second resource reservation with a transmission of data in the second resource (e.g., after the first resource). The second resource may include one or more resource blocks. The second resource reservation may reserve one or more resources for future transmissions of the second UE.

As shown by reference number 515, the first resource reservation and the second resource reservation may both reserve a conflicting resource (e.g., a resource reserved by the first UE that overlaps in one or more of time or frequency with the second UE). In some aspects, the first resource reservation may have a same priority as, or a higher priority than, the second resource reservation. In some aspects, the second resource reservation may not be permitted (e.g., based at least in part on a communication standard) to preempt the first resource reservation. In some aspects, the second UE may be permitted to transmit the second resource reservation based at least in part on a signal strength (e.g., as observed by the second UE) of the first resource reservation. However, an additional UE (e.g., the third UE of FIG. 4) may be within coverage of the first UE and the second UE, and may be unable to receive a transmission by the first UE in the conflicting resource if the second UE also transmits in the conflicting resource.

As shown by reference number 520, the first UE or an additional UE may transmit an indication of a conflict. For example, the first UE or the additional UE may transmit an indication that at least one resource of the one or more resources is in conflict with an additional resource reservation. In some aspects, the indication may identify the conflicting resource, a resource reservation that caused the conflict (e.g., the second resource reservation), an identification of a UE that transmitted the second resource reservation that caused the conflict, and/or the like.

In some aspects, the identification of the conflicting resource may include frequency information of the conflicting resource (e.g., a frequency allocation of an associated PSSCH (e.g., to resolve a partial conflict where only some resource blocks of the second resource reservation cause a conflict) or location of an associated PSCCH (e.g., using fewer bits than a number of bits to identify the frequency allocation of the conflicting resource)). In some aspects, the identification of the conflicting resource may include time information (e.g., one or more slots) of the conflicting resources. In some aspects, the conflicting resource may be up to 31 slots after the second resource reservation.

In some aspects, the identification of the second resource reservation (e.g., a portion of the second reservation that identifies the conflicting resource) may include frequency information (e.g., a PSCCH subchannel) of a PSCCH where the reservation for the conflicting resource was indicated. In some aspects, the identification of the second resource reservation may include time information (e.g., one or more slots) of the PSCCH where the reservation for the conflicting resource was indicated. In some aspects, the time information may indicate a general location of the PSCCH where the reservation for the conflicting resource was indicated (e.g., with fewer bits than a number of bits to indicate a precise location of the PSCCH). In some aspects, the identification of the second resource reservation may include an index of the reservation of the conflicting resource (e.g., with one bit if a maximum number of future reservations is two), an implicit indication of the reservation of the conflicting resource (e.g., when only one future reservation is made, a presence of the indication implies that the one future reservation is associated with the conflicting resource).

In some aspects, the identification of the second resource reservation may identify the SCI that contains the second resource reservation. In these aspects, the second UE may cancel all future reservations indicated in the SCI. In some aspects, the identification of the second resource reservation includes an indication of a frequency domain orthogonal cover code (FDD-OCC) index used for a DMRS of the PSCCH in which the second UE transmitted the second resource reservation.

As indicated above, FIG. 5 is provided as an example. Other examples may differ from what is described with respect to FIG. 5.

Figure 6:
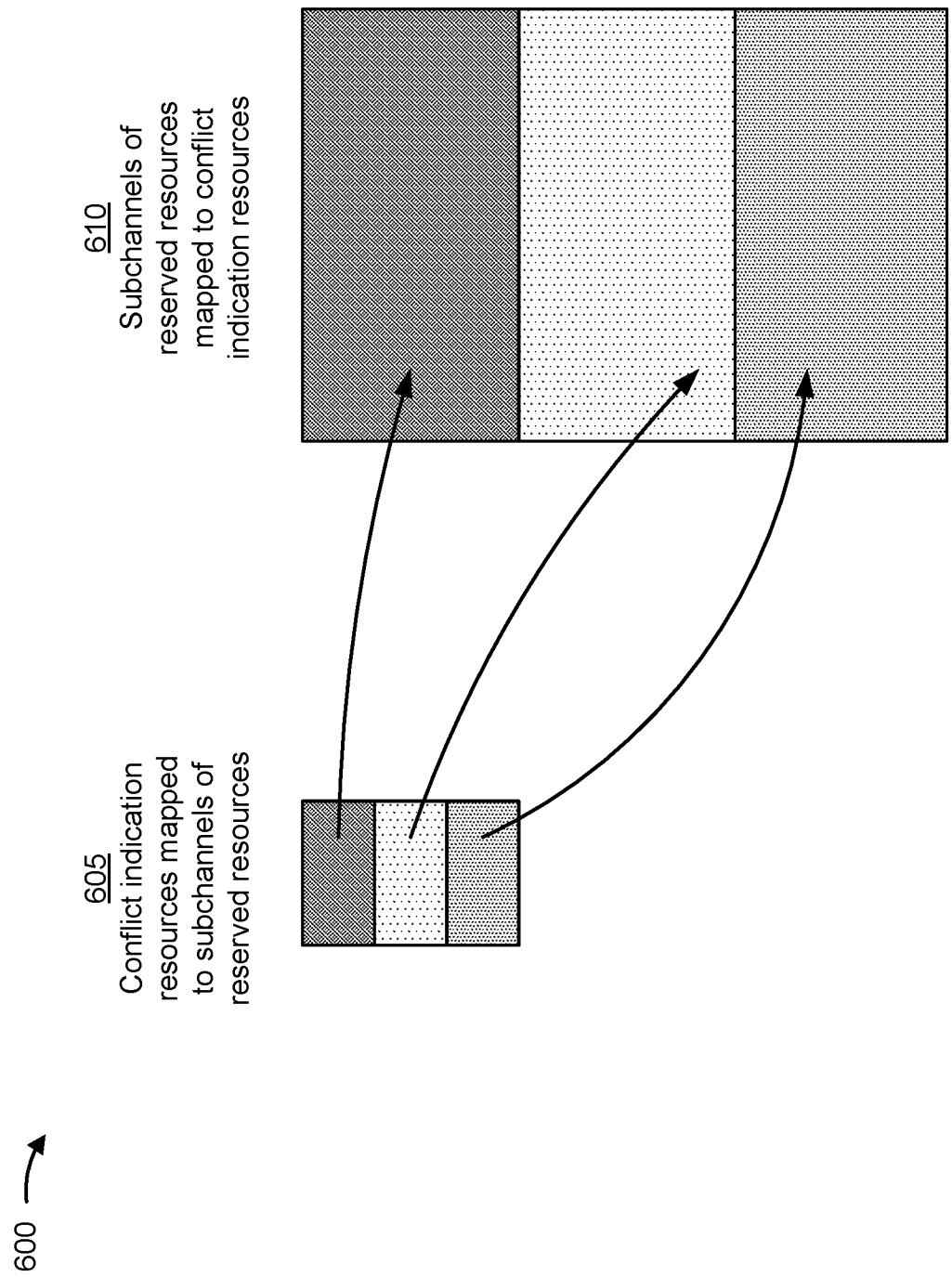
FIG. 6 is a diagram illustrating an example of techniques for providing an indication of a reservation conflict, in accordance with various aspects of the present disclosure.

FIG. 6 is a diagram illustrating an example 600 of techniques for providing an indication of a reservation conflict, in accordance with various aspects of the present disclosure. As shown in FIG. 6, a first UE (e.g., UE 120) and a second UE (e.g., UE 120) may communicate using, for example, sidelink channel communications. The first UE and the second UE may be part of a wireless network that includes one or more additional UEs.

As shown in FIG. 6, and by reference number 605, conflict indication resources may be associated with (e.g., mapped to) subchannels of reserved resources. As shown by reference number 610, the subchannels of the reserved resources may be associated with the conflict indication resources. For example, the first UE, the second UE, and/or one or more additional UEs may be configured to determine resources to be used, based at least in part on time-frequency locations of subchannels of a conflicting resource, to indicate a resource reservation conflict. In some aspects, the first UE, the second UE, and/or the one or more additional UEs may be configured to use sequence-based transmissions to provide the identification of the conflict. In some aspects, the subchannels may have a 1-to-1 mapping to resource blocks of the conflict indication resources. In some aspects, the subchannels of the reserved resources may be associated with multiple resource blocks to increase a capacity for additional information (e.g., the identifications described herein).

As indicated above, FIG. 6 is provided as an example. Other examples may differ from what is described with respect to FIG. 6.

Figure 7:
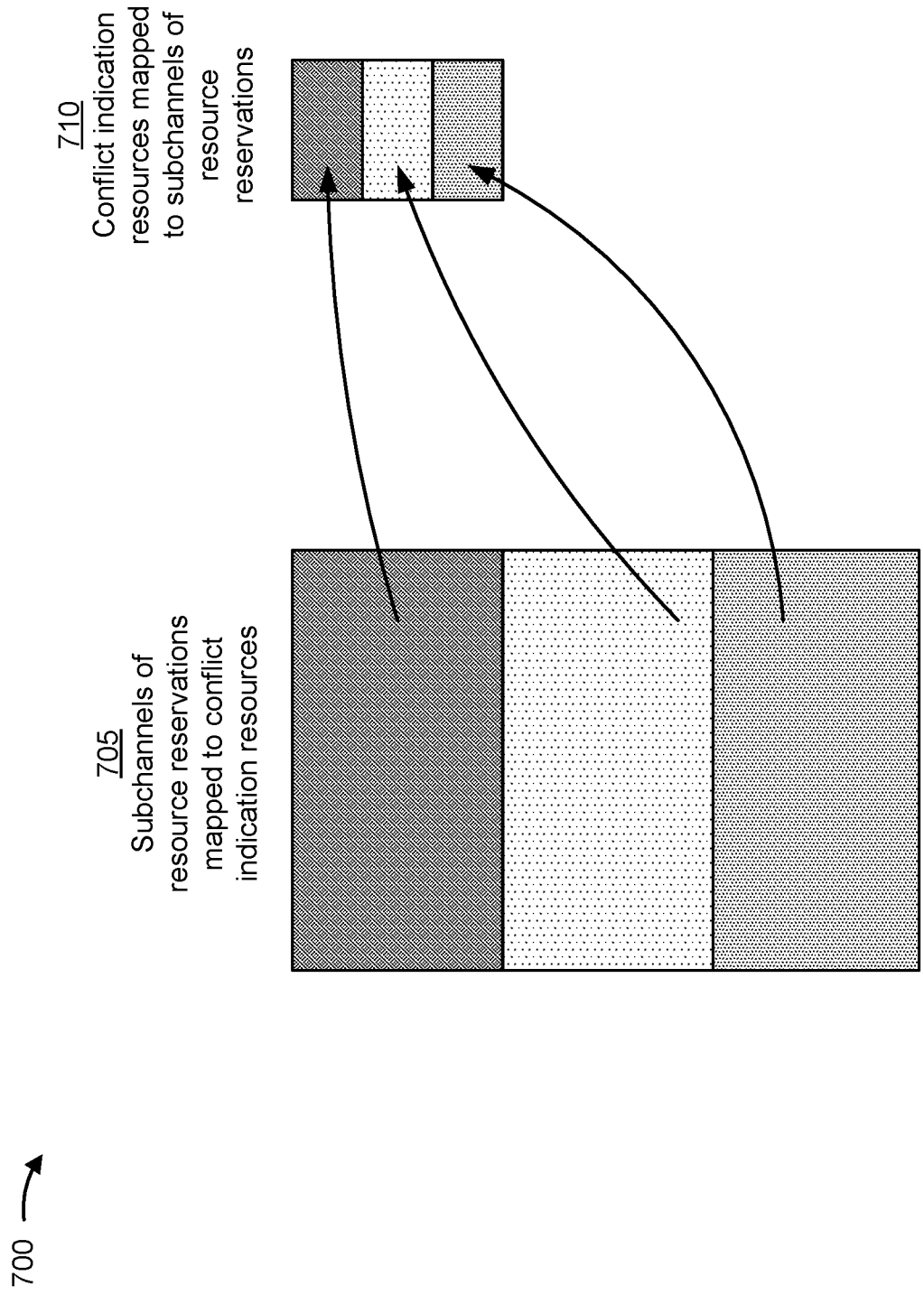
FIG. 7 is a diagram illustrating an example of techniques for providing an indication of a reservation conflict, in accordance with various aspects of the present disclosure.

FIG. 7 is a diagram illustrating an example 700 of techniques for providing an indication of a reservation conflict, in accordance with various aspects of the present disclosure. As shown in FIG. 7, a first UE (e.g., UE 120) and a second UE (e.g., UE 120) may communicate using, for example, sidelink channel communications. The first UE and the second UE may be part of a wireless network that includes one or more additional UEs.

As shown in FIG. 7, and by reference number 705, subchannels of resource reservations may be associated with conflict indication resources. As shown by reference number 710, the conflict indication resources may be associated with the subchannels of the resource reservations. For example, the first UE, the second UE, and/or one or more additional UEs may be configured to determine resources to be used, based at least in part on time-frequency locations of subchannels of a resource reservation used to reserve a conflicting resource, to indicate a resource reservation conflict. In some aspects, the first UE, the second UE, and/or the one or more additional UEs may be configured to use sequence-based transmissions to provide the identification of the conflict. In some aspects, the subchannels of the resource reservations may have a 1-to-1 mapping to resource blocks of the conflict indication resources. In some aspects, the subchannels may be associated with multiple resource blocks to increase a capacity for additional information (e.g., the identifications described herein). In some aspects, the first UE, the second UE, and/or the one or more additional UEs may use a cyclic shift to indicate a reservation index with SCI to indicate which reserved resource is in conflict with a previous reservation.

As indicated above, FIG. 7 is provided as an example. Other examples may differ from what is described with respect to FIG. 7.

Figure 8:
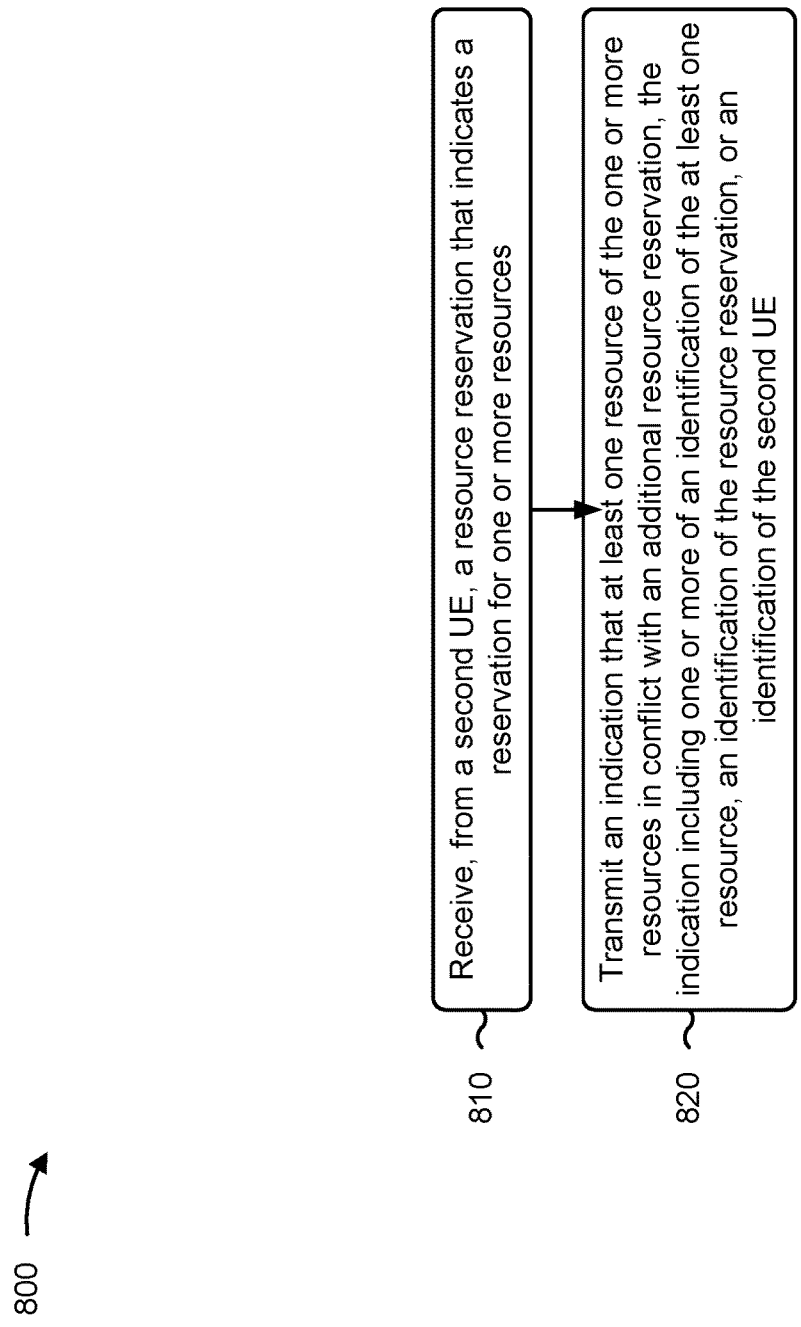
FIG. 8 is a diagram illustrating an example process performed, for example, by a user equipment, in accordance with various aspects of the present disclosure.

FIG. 8 is a diagram illustrating an example process 800 performed, for example, by a first UE, in accordance with various aspects of the present disclosure. Example process 800 is an example where the first UE (e.g., first UE 120 and/or the like) performs operations associated with techniques for providing an indication of a reservation conflict.

As shown in FIG. 8, in some aspects, process 800 may include receiving, from a second UE, a resource reservation that indicates a reservation for one or more resources (block 810). For example, the first UE (e.g., using receive processor 258, controller/processor 280, memory 282, and/or the like) may receive, from a second UE, a resource reservation that indicates a reservation for one or more resources, as described above.

As further shown in FIG. 8, in some aspects, process 800 may include transmitting an indication that at least one resource of the one or more resources is in conflict with an additional resource reservation (e.g., is reserved), the indication including one or more of an identification of the at least one resource, an identification of the resource reservation, or an identification of the second UE (block 820). For example, the first UE (e.g., using transmit processor 264, controller/processor 280, memory 282, and/or the like) may transmit an indication that at least one resource of the one or more resources is in conflict with an additional resource reservation, the indication including one or more of an identification of the at least one resource, an identification of the resource reservation, or an identification of the second UE, as described above.

Process 800 may include additional aspects, such as any single aspect or any combination of aspects described below and/or in connection with one or more other processes described elsewhere herein.

In a first aspect, transmitting the indication includes transmitting the indication via one or more of an SCI message, one or more MAC CEs, or a sidelink physical channel communication.

In a second aspect, alone or in combination with the first aspect, the at least one resource is reserved by the UE or an additional UE.

In a third aspect, alone or in combination with one or more of the first and second aspects, the resource reservation indicates a reservation for a resource that is not reserved, and the indication includes the identification of the at least one resource and not an identification of the resource that is not reserved.

In a fourth aspect, alone or in combination with one or more of the first through third aspects, process 800 includes receiving, before receiving the resource reservation, a previous resource reservation that indicates an additional reservation for the at least one resource, wherein the previous resource reservation has a same priority or a higher priority than a priority of the resource reservation.

In a fifth aspect, alone or in combination with one or more of the first through fourth aspects, process 800 includes transmitting, before receiving the resource reservation, a previous resource reservation, wherein the previous resource reservation has a same priority or a higher priority than a priority of the resource reservation.

In a sixth aspect, alone or in combination with one or more of the first through fifth aspects, the indication includes an identification of the at least one resource, and the identification of the at least one resource includes one or more of an identification of a frequency allocation of a PSCCH of the at least one resource, an identification of a frequency allocation of a PSSCH of the at least one resource, or an identification of a time allocation of the at least one resource.

In a seventh aspect, alone or in combination with one or more of the first through sixth aspects, the indication includes the identification of the resource reservation, and the identification of the resource reservation includes one or more of an indication of a frequency allocation of a PSCCH associated with the resource reservation, an indication of a time allocation of the PSCCH associated with the resource reservation, an indication that identifies a portion of the resource reservation that indicates a reservation of the at least one resource, or a cover code index for a DMRS used for the resource reservation.

In an eighth aspect, alone or in combination with one or more of the first through seventh aspects, the identification of the resource reservation includes the indication that identifies the portion of the resource reservation that indicates the reservation of the at least one resource, and the indication that identifies the portion of the resource reservation that indicates the reservation of the at least one resource is indicated using a single bit.

In a ninth aspect, alone or in combination with one or more of the first through eighth aspects, the indication includes the identification of the second UE, and the identification of the second UE includes a source identification of the resource reservation.

In a tenth aspect, alone or in combination with one or more of the first through ninth aspects, the indication includes one or more of an indication of a priority of the resource reservation, or an indication of a priority of a previous resource reservation that indicates an additional reservation for the at least one resource.

In an eleventh aspect, alone or in combination with one or more of the first through tenth aspects, transmitting the indication includes one or more of transmitting the indication as a sequence-based indication of the at least one resource, or transmitting the indication as a sequence-based indication of the resource reservation.

In a twelfth aspect, alone or in combination with one or more of the first through eleventh aspects, transmitting the indication includes one or more of transmitting a first indication, of the indication, associated with a first subchannel of the at least one resource, and transmitting a second indication, of the indication, associated with a second subchannel of the at least one resource.

In a thirteenth aspect, alone or in combination with one or more of the first through twelfth aspects, transmitting the first indication includes transmitting the first indication using a first set of resource blocks that are associated with the first subchannel, transmitting the first indication using a first set of resource blocks that are associated with a subchannel that contains the resource reservation, transmitting the second indication using a second set of resource blocks that are associated with the second subchannel, or transmitting the second indication using a second set of resource blocks that are associated with a subchannel that contains the resource reservation.

In a fourteenth aspect, alone or in combination with one or more of the first through thirteenth aspects, the first set of resource blocks are associated with the first subchannel based at least in part on one or more of a location of the first subchannel, or a location of the resource reservation.

In a fifteenth aspect, alone or in combination with one or more of the first through fourteenth aspects, the at least one resource of the one or more resources is in conflict with the additional resource reservation based at least in part on an overlap of the at least one resource of the one or more resources with a resource associated with the additional resource reservation, the overlap of the at least one resource of the one or more resources with the resource associated with the additional resource reservation being in one of time, frequency, or both.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
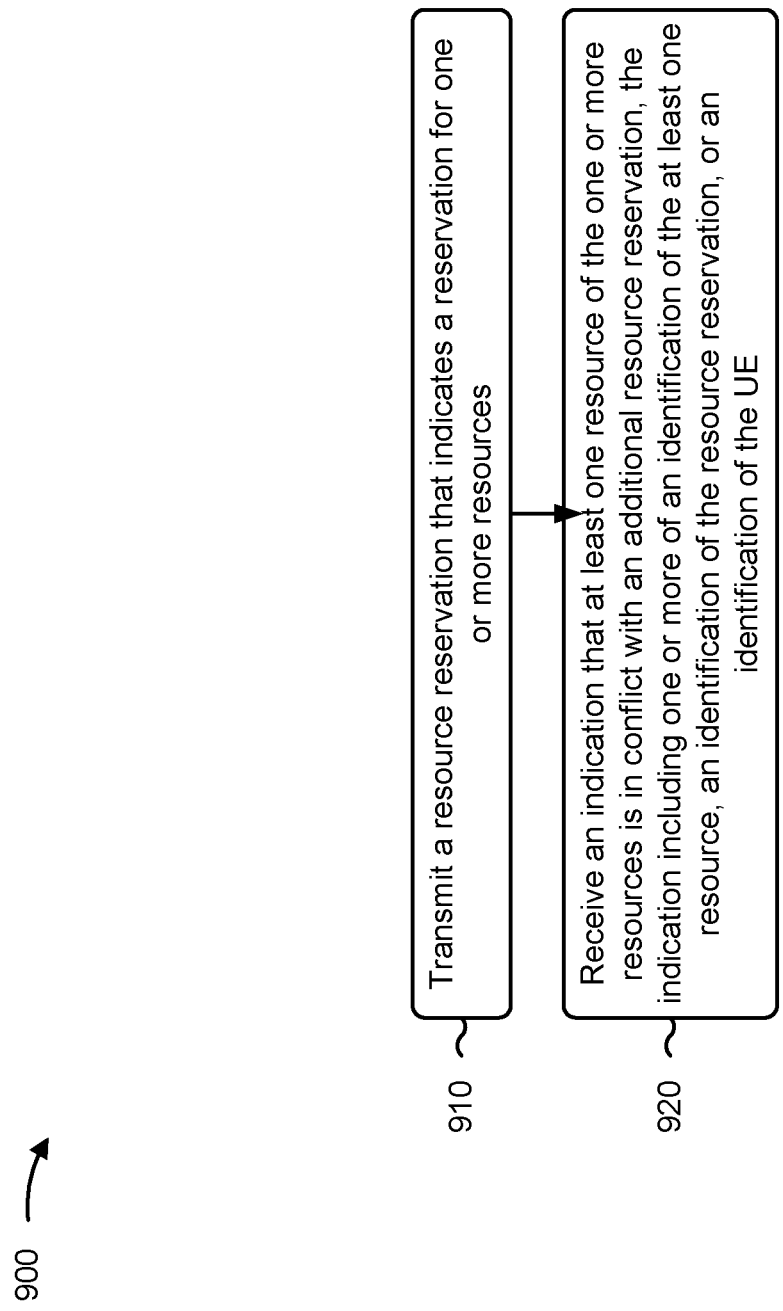
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with techniques for providing an indication of a reservation conflict.

As shown in FIG. 9, in some aspects, process 900 may include transmitting a resource reservation that indicates a reservation for one or more resources (block 910). For example, the UE (e.g., using transmit processor 264, controller/processor 280, memory 282, and/or the like) may transmit a resource reservation that indicates a reservation for one or more resources, as described above.

As further shown in FIG. 9, in some aspects, process 900 may include receiving an indication that at least one resource of the one or more resources is in conflict with an additional resource reservation (e.g., is reserved), the indication including one or more of an identification of the at least one resource, an identification of the resource reservation, or an identification of the UE (block 920). For example, the UE (e.g., using receive processor 258, controller/processor 280, memory 282, and/or the like) may receive an indication that at least one resource of the one or more resources is in conflict with an additional resource reservation, the indication including one or more of an identification of the at least one resource, an identification of the resource reservation, or an identification of the UE, as described above.

Process 900 may include additional aspects, such as any single aspect or any combination of aspects described below and/or in connection with one or more other processes described elsewhere herein.

In a first aspect, process 900 includes canceling, based at least in part on the indication including the identification of the at least one resource, a transmission on the at least one resource and performing a transmission on another resource of the one or more resources, or canceling, based at least in part on the indication including the identification of the resource reservation or the identification of the UE, transmissions on the one or more resources.

In a second aspect, alone or in combination with the first aspect, the resource reservation indicates a reservation for a resource that is not reserved.

In a third aspect, alone or in combination with one or more of the first and second aspects, the indication includes the identification of the at least one resource and not an identification of the resource that is not reserved, and process 900 further includes canceling a transmission on the at least one resource, and performing a transmission on the resource that is not reserved.

In a fourth aspect, alone or in combination with one or more of the first through third aspects, the indication includes an identification of the at least one resource, and the identification of the at least one resource includes one or more of an identification of a frequency allocation of a PSCCH of the at least one resource, an identification of a frequency allocation of a PSSCH of the at least one resource, or an identification of a time allocation of the at least one resource.

In a fifth aspect, alone or in combination with one or more of the first through fourth aspects, the indication includes the identification of the resource reservation, and the identification of the resource reservation includes one or more of an indication of a frequency allocation of a PSCCH associated with the resource reservation, an indication of a time allocation of the PSCCH associated with the resource reservation, an indication that identifies a portion of the resource reservation that indicates a reservation of the at least one resource, or a cover code index for a DMRS used for the resource reservation.

In a sixth aspect, alone or in combination with one or more of the first through fifth aspects, the identification of the resource reservation includes the indication that identifies the portion of the resource reservation that indicates the reservation of the at least one resource, and the indication that identifies the portion of the resource reservation that indicates the reservation of the at least one resource is indicated using a single bit.

In a seventh aspect, alone or in combination with one or more of the first through sixth aspects, the indication includes the identification of the UE, and the identification of the UE includes a source identification of the resource reservation.

In an eighth aspect, alone or in combination with one or more of the first through seventh aspects, the indication includes one or more of an indication of a priority of the resource reservation, or an indication of a priority of a previous resource reservation that indicates an additional reservation for the at least one resource.

In a ninth aspect, alone or in combination with one or more of the first through eighth aspects, receiving the indication includes one or more of receiving the indication as a sequence-based indication of the at least one resource, or receiving the indication as a sequence-based indication of the resource reservation.

In a tenth aspect, alone or in combination with one or more of the first through ninth aspects, receiving the indication includes one or more of receiving a first indication, of the indication, associated with a first subchannel of the at least one resource, and receiving a second indication, of the indication, associated with a second subchannel of the at least one resource.

In an eleventh aspect, alone or in combination with one or more of the first through tenth aspects, receiving the first indication includes receiving the first indication using a first set of resource blocks that are associated with the first subchannel, receiving the first indication using a first set of resource blocks that are associated with a subchannel that contains the resource reservation, receiving the second indication using a second set of resource blocks that are associated with the second subchannel, or receiving the second indication using a second set of resource blocks that are associated with a subchannel that contains the resource reservation.

In a twelfth aspect, alone or in combination with one or more of the first through eleventh aspects, the first set of resource blocks are associated with the first subchannel based at least in part on one or more of: a location of the first subchannel, or a location of the resource reservation.

In a thirteenth aspect, alone or in combination with one or more of the first through twelfth aspects, the at least one resource of the one or more resources is in conflict with the additional resource reservation based at least in part on the at least one resource of the one or more resources overlapping in one or more of time or frequency with a resource associated with the additional resource reservation.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
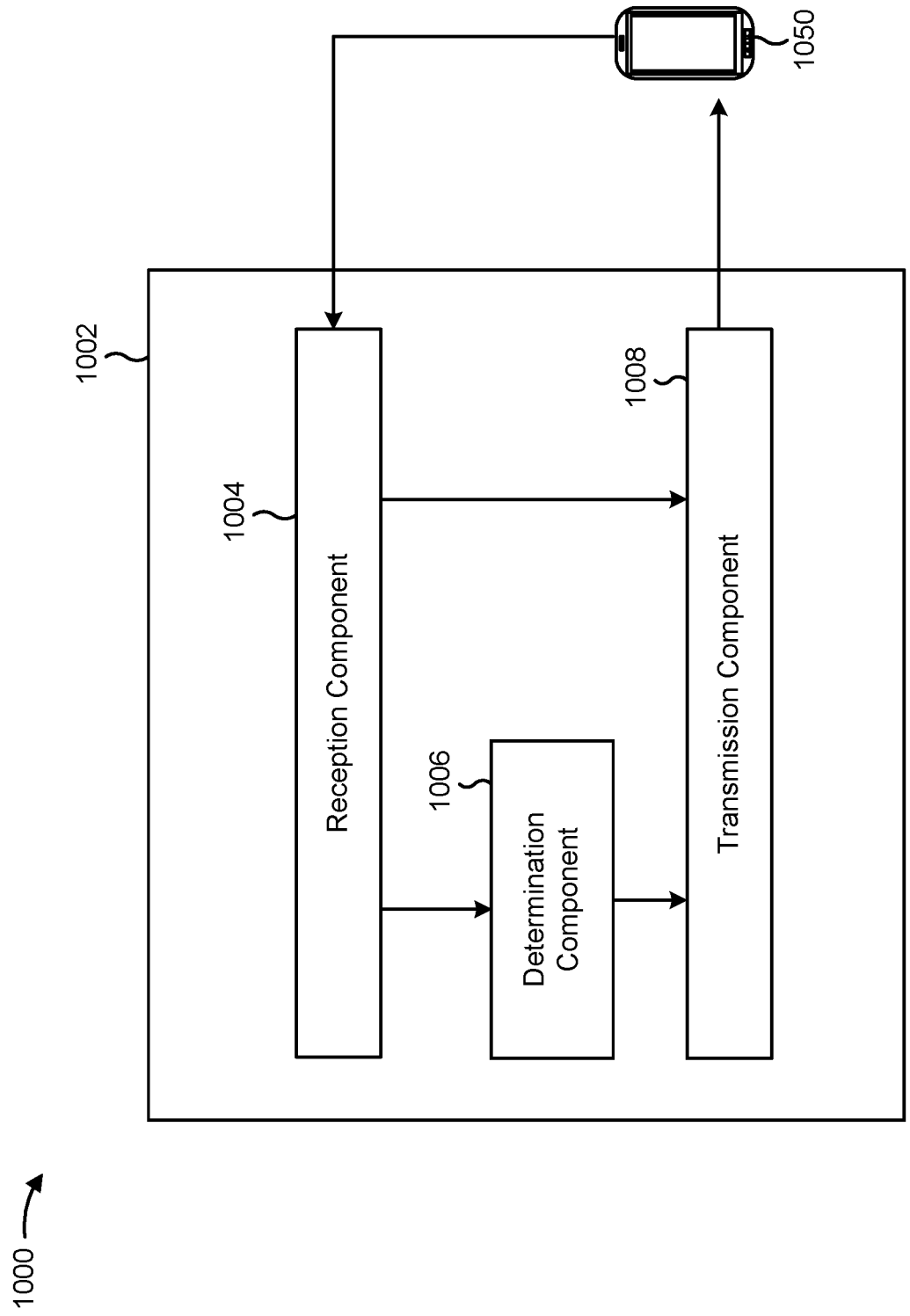
FIG. 10 is a data flow diagram illustrating a data flow between different components in an example apparatus, in accordance with various aspects of the present disclosure.

FIG. 10 is a conceptual data flow diagram 1000 illustrating a data flow between different components in an example apparatus 1002. The apparatus 1002 may be a UE (e.g., the first UE of FIG. 4, UE 120). In some aspects, the apparatus 1002 includes a reception component 1004, a determination component 1006, and/or a transmission component 1008.

In some aspects, the reception component 1004 may receive multiple resource reservations that indicate reservations for one or more resources. The determination component 1006 may determine whether a conflict exists between the multiple resource reservations. For example, the reception component 1004 may receive a first resource reservation that indicates a reservation for a first resource and a second resource. The reception component 1004 may also receive a second resource reservation that indicates a reservation for the second resource and a third resource. The determination component 1006 may determine that a conflict exists for the second resource, that the second resource reservation should cancel a transmission in the second resource, how (e.g., with what information, in what resources, using what format, and/or the like) to transmit an indication of the conflict, and/or the like. The transmission component 1008 may transmit (e.g., broadcast, unicast, and/or the like) the indication, to another UE 1050 (e.g., the UE 1050 associated with the second resource reservation) based at least in part on a determination by the determination component 1006.

In some aspects, the transmission component 1008 may transmit a resource reservation that indicates a reservation for one or more resources. The transmission component may transmit (e.g., broadcast, unicast, and/or the like) the resource reservation to one or more UEs 1050. For example, an apparatus 1000 that includes the first UE or the second UE may transmit the resource reservation.

The reception component 1004 may receive an indication that at least one reserved resource of the reservation is reserved. For example, an apparatus that includes the second UE may receive the indication that at least one reserved resource of the reservation is reserved. The indication may include an identification of the at least one resource, an identification of the resource reservation, an identification of the UE, and/or the like. The determination component 1006 may determine reserved resources of the resource reservation that are to be canceled based at least in part on the indication. The transmission component may transmit in any resources that are not indicated as being in conflict with a previous reservation.

The apparatus may include additional components that perform each of the blocks of the algorithm in the aforementioned process 800 of FIG. 8, process 900 of FIG. 9, and/or the like. Each block in the aforementioned process 800 of FIG. 8, process 900 of FIG. 9, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 1000 are provided as an example. In practice, there may be additional components, fewer components, different components, or differently arranged components than those shown in FIG. 1000. Furthermore, two or more components shown in FIG. 1000 may be implemented within a single component, or a single component shown in FIG. 1000 may be implemented as multiple, distributed components. Additionally, or alternatively, a set of components (e.g., one or more components) shown in FIG. 10 may perform one or more functions described as being performed by another set of components shown in FIG. 10.

The following provides an overview of some Aspects of the present disclosure:

Aspect 1: A method of wireless communication performed by a first user equipment (UE), comprising: receiving, from a second UE, a resource reservation that indicates a reservation for one or more resources; and transmitting an indication that at least one resource of the one or more resources is in conflict with an additional resource reservation, the indication including one or more of an identification of the at least one resource, an identification of the resource reservation, or an identification of the second UE.

Aspect 2: The method of Aspect 1, wherein transmitting the indication comprises one or more of: transmitting the indication via one or more of a sidelink control information message, one or more medium access control control elements, or a sidelink physical channel communication transmitting the indication as a sequence-based indication of the at least one resource, or transmitting the indication as a sequence-based indication of the resource reservation.

Aspect 3: The method of any of Aspects 1-2, wherein the at least one resource is reserved by the UE or an additional UE.

Aspect 4: The method of any of Aspects 1-3, wherein the resource reservation indicates a reservation for a resource that is not reserved, and wherein the indication includes the identification of the at least one resource and not an identification of the resource that is not reserved.

Aspect 5: The method of any of Aspects 1-4, further comprising: receiving, before receiving the resource reservation, a previous resource reservation that indicates an additional reservation for the at least one resource, wherein the previous resource reservation has a same priority or a higher priority than a priority of the resource reservation; or transmitting, before receiving the resource reservation, a previous resource reservation, wherein the previous resource reservation has a same priority or a higher priority than a priority of the resource reservation.

Aspect 6: The method of any of Aspects 1-5, wherein the indication includes an identification of the at least one resource, and wherein the identification of the at least one resource comprises one or more of: an identification of a frequency allocation of a physical sidelink control channel of the at least one resource, an identification of a frequency allocation of a physical sidelink shared channel of the at least one resource, or an identification of a time allocation of the at least one resource.

Aspect 7: The method of any of Aspects 1-5, wherein the indication includes the identification of the resource reservation, and wherein the identification of the resource reservation comprises one or more of: an indication of a frequency allocation of a physical sidelink control channel associated with the resource reservation, an indication of a time allocation of the physical sidelink control channel associated with the resource reservation, an indication that identifies a portion of the resource reservation that indicates a reservation of the at least one resource, or a cover code index for a demodulation reference signal used for the resource reservation.

Aspect 8: The method of any of Aspects 1-7, wherein the identification of the second UE includes a source identification of the resource reservation, or wherein the indication comprises one or more of: an indication of a priority of the resource reservation, or an indication of a priority of a previous resource reservation that indicates an additional reservation for the at least one resource.

Aspect 9: The method of any of Aspects 1-8, wherein transmitting the indication comprises one or more of: transmitting a first indication, of the indication, associated with a first subchannel of the at least one resource, or transmitting a second indication, of the indication, associated with a second subchannel of the at least one resource, wherein transmitting the first indication comprises: transmitting the first indication using a first set of resource blocks that are associated with the first subchannel, transmitting the first indication using a first set of resource blocks that are associated with a subchannel that contains the resource reservation, transmitting the second indication using a second set of resource blocks that are associated with the second subchannel, or transmitting the second indication using a second set of resource blocks that are associated with a subchannel that contains the resource reservation.

Aspect 10: The method of Aspect 9, wherein the first set of resource blocks are associated with the first subchannel based at least in part on one or more of: a location of the first subchannel, or a location of the resource reservation.

Aspect 11: The method of any of Aspects 1-10, wherein the at least one resource of the one or more resources is in conflict with the additional resource reservation based at least in part on the at least one resource of the one or more resources overlapping in one or more of time or frequency with a resource associated with the additional resource reservation.

Aspect 12: An apparatus for wireless communication at a device, comprising a processor; memory coupled with the processor; and instructions stored in the memory and executable by the processor to cause the apparatus to perform the method of one or more Aspects of Aspects 1-11.

Aspect 13: A device for wireless communication, comprising a memory and one or more processors coupled to the memory, the memory and the one or more processors configured to perform the method of one or more Aspects of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more Aspects of Aspects 1-11.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   receiving, in a sidelink control information message from a second UE, a resource reservation that indicates a reservation for one or more resources; and
   transmitting, via a sidelink physical channel communication and based at least in part on receiving the resource reservation, an indication that at least one resource of the one or more resources is in conflict with an additional resource reservation, the indication including an identification of the at least one resource, the indication being transmitted in a resource that is determined based at least in part on the resource reservation.

2. The method of claim 1, wherein the at least one resource of the one or more resources is in conflict with the additional resource reservation based at least in part on the at least one resource of the one or more resources overlapping in one or more of time or frequency with a resource associated with the additional resource reservation.

3. The method of claim 1, wherein transmitting the indication further comprises one or more of:
   transmitting the indication via one or more of a sidelink control information message or one or more medium access control control elements;
   transmitting the indication as a sequence-based indication of the at least one resource; or
   transmitting the indication as a sequence-based indication of the resource reservation.

4. The method of claim 1, wherein the at least one resource is reserved by the first UE or an additional UE.

5. The method of claim 1, wherein the resource reservation indicates a reservation for a resource that is not reserved, and
   wherein the indication includes the identification of the at least one resource and not an identification of the resource that is not reserved.

6. The method of claim 1, further comprising:
   receiving, before receiving the resource reservation, a previous resource reservation that indicates an additional reservation for the at least one resource; or
   transmitting, before receiving the resource reservation, a previous resource reservation,
      wherein the previous resource reservation has a same priority or a higher priority than a priority of the resource reservation.

7. The method of claim 1,
   wherein the identification of the at least one resource comprises one or more of:
      an identification of a frequency allocation of a physical sidelink control channel of the at least one resource,
      an identification of a frequency allocation of a physical sidelink shared channel of the at least one resource, or
      an identification of a time allocation of the at least one resource.

8. The method of claim 1, wherein the indication further includes an identification of the resource reservation, and wherein the identification of the resource reservation comprises one or more of:
an indication of a frequency allocation of a physical sidelink control channel associated with the resource reservation,
an indication of a time allocation of the physical sidelink control channel associated with the resource reservation,
an indication that identifies a portion of the resource reservation that indicates a reservation of the at least one resource, or
a cover code index for a demodulation reference signal used for the resource reservation.

9. The method of claim 1, wherein the indication further includes a source identification of the resource reservation, or
wherein the indication comprises one or more of:
an indication of a priority of the resource reservation, or
an indication of a priority of a previous resource reservation that indicates an additional reservation for the at least one resource.

10. The method of claim 1, wherein transmitting the indication comprises one or more of:
transmitting a first indication, of the indication, associated with a first subchannel of the at least one resource; and
transmitting a second indication, of the indication, associated with a second subchannel of the at least one resource,
wherein transmitting the first indication comprises:
transmitting the first indication using a first set of resource blocks that are associated with the first subchannel,
transmitting the first indication using a first set of resource blocks that are associated with a subchannel that contains the resource reservation,
transmitting the second indication using a second set of resource blocks that are associated with the second subchannel, or
transmitting the second indication using a second set of resource blocks that are associated with a subchannel that contains the resource reservation.

11. The method of claim 10, wherein the first set of resource blocks are associated with the first subchannel based at least in part on one or more of:
a location of the first subchannel, or
a location of the resource reservation.

12. A first user equipment (UE) for wireless communication, comprising:
one or more memories; and
one or more processors coupled to the one or more memories, the one or more processors configured to:
receive, in a sidelink control information message from a second UE, a resource reservation that indicates a reservation for one or more resources; and
transmit, via a sidelink physical channel communication and based at least in part on reception of the resource reservation, an indication that at least one resource of the one or more resources is in conflict with an additional resource reservation, the indication including an identification of the at least one resource, the indication being transmitted in a resource that is determined based at least in part on the resource reservation.

13. The first UE of claim 12, wherein the at least one resource of the one or more resources is in conflict with the additional resource reservation based at least in part on the at least one resource of the one or more resources overlapping in one or more of time or frequency with a resource associated with the additional resource reservation.

14. The first UE of claim 12, wherein transmission of the indication further comprises one or more of:
transmission of the indication via one or more of a sidelink control information message or one or more medium access control control elements;
transmission of the indication as a sequence-based indication of the at least one resource; or
transmission of the indication as a sequence-based indication of the resource reservation.

15. The first UE of claim 12, wherein the at least one resource is reserved by the first UE or an additional UE.

16. The first UE of claim 12, wherein the resource reservation indicates a reservation for a resource that is not reserved, and
wherein the indication includes the identification of the at least one resource and not an identification of the resource that is not reserved.

17. The first UE of claim 12, wherein the one or more processors are further configured to:
receive, before reception of the resource reservation, a previous resource reservation that indicates an additional reservation for the at least one resource; or
transmit, before reception of the resource reservation, the previous resource reservation,
wherein the previous resource reservation has a same priority or a higher priority than a priority of the resource reservation.

18. The first UE of claim 12,
wherein the identification of the at least one resource comprises one or more of:
an identification of a frequency allocation of a physical sidelink control channel of the at least one resource,
an identification of a frequency allocation of a physical sidelink shared channel of the at least one resource, or
an identification of a time allocation of the at least one resource.

19. The first UE of claim 12, wherein the indication further includes an identification of the resource reservation, and
wherein the identification of the resource reservation comprises one or more of:
an indication of a frequency allocation of a physical sidelink control channel associated with the resource reservation,
an indication of a time allocation of the physical sidelink control channel associated with the resource reservation,
an indication that identifies a portion of the resource reservation that indicates a reservation of the at least one resource, or
a cover code index for a demodulation reference signal used for the resource reservation.

20. The first UE of claim 12, wherein the wherein the indication further includes a source identification of the resource reservation, or
wherein the indication comprises one or more of:
an indication of a priority of the resource reservation, or
an indication of a priority of a previous resource reservation that indicates an additional reservation for the at least one resource.

21. The first UE of claim 12, wherein transmission of the indication comprises one or more of:

transmission of a first indication, of the indication, associated with a first subchannel of the at least one resource, and
transmission of a second indication, of the indication, associated with a second subchannel of the at least one resource,
wherein the transmission of the first indication comprises:
transmission of the first indication using a first set of resource blocks that are associated with the first subchannel,
transmission of the first indication using a first set of resource blocks that are associated with a subchannel that contains the resource reservation,
transmission of the second indication using a second set of resource blocks that are associated with the second subchannel, or
transmission of the second indication using a second set of resource blocks that are associated with a subchannel that contains the resource reservation.

22. The first UE of claim 21, wherein the first set of resource blocks are associated with the first subchannel based at least in part on one or more of:
a location of the first subchannel, or
a location of the resource reservation.

23. A non-transitory computer-readable medium storing one or more instructions for wireless communication, the one or more instructions comprising:
one or more instructions that, when executed by one or more processors of a first user equipment (UE), cause the one or more processors to:
receive, in a sidelink control information message from a second UE, a resource reservation that indicates a reservation for one or more resources; and
transmit, via a sidelink physical channel communication and based at least in part on reception of the resource reservation, an indication that at least one resource of the one or more resources is in conflict with an additional resource reservation, the indication including an identification of the at least one resource, the indication being transmitted in a resource that is determined based at least in part on the resource reservation.

24. The non-transitory computer-readable medium of claim 23, wherein transmission of the indication further comprises one or more of:
transmission of the indication via one or more of a sidelink control information message or one or more medium access control control elements;
transmission of the indication as a sequence-based indication of the at least one resource; or
transmission of the indication as a sequence-based indication of the resource reservation.

25. The non-transitory computer-readable medium of claim 23,
wherein the identification of the at least one resource comprises one or more of:
an identification of a frequency allocation of a physical sidelink control channel of the at least one resource,
an identification of a frequency allocation of a physical sidelink shared channel of the at least one resource, or
an identification of a time allocation of the at least one resource.

26. The non-transitory computer-readable medium of claim 23, wherein the indication further includes an identification of the resource reservation, and
wherein the identification of the resource reservation comprises one or more of:
an indication of a frequency allocation of a physical sidelink control channel associated with the resource reservation,
an indication of a time allocation of the physical sidelink control channel associated with the resource reservation,
an indication that identifies a portion of the resource reservation that indicates a reservation of the at least one resource, or
a cover code index for a demodulation reference signal used for the resource reservation.

27. An apparatus for wireless communication, comprising:
means for receiving, in a sidelink control information message from a UE, a resource reservation that indicates a reservation for one or more resources; and
means for transmitting, via a sidelink physical channel communication and based at least in part on reception of the resource reservation, an indication that at least one resource of the one or more resources is in conflict with an additional resource reservation, the indication including an identification of the at least one resource, the indication being transmitted in a resource that is determined based at least in part on the resource reservation.

28. The apparatus of claim 27, wherein the means for transmitting the indication further comprises one or more of:
means for transmitting the indication via one or more of a sidelink control information message or one or more medium access control control elements;
means for receiving the indication as a sequence-based indication of the at least one resource; or
means for receiving the indication as a sequence-based indication of the resource reservation.

29. The apparatus of claim 27,
wherein the identification of the at least one resource comprises one or more of:
an identification of a frequency allocation of a physical sidelink control channel of the at least one resource,
an identification of a frequency allocation of a physical sidelink shared channel of the at least one resource, or
an identification of a time allocation of the at least one resource.

30. The apparatus of claim 27,
wherein the identification of the resource reservation comprises one or more of:
an indication of a frequency allocation of a physical sidelink control channel associated with the resource reservation,
an indication of a time allocation of the physical sidelink control channel associated with the resource reservation,
an indication that identifies a portion of the resource reservation that indicates a reservation of the at least one resource, or
a cover code index for a demodulation reference signal used for the resource reservation.

* * * * *